United States Patent
Greene

(10) Patent No.: US 7,337,045 B2
(45) Date of Patent: Feb. 26, 2008

(54) AIRBORNE WINDSHEAR DETECTION AND WARNING SYSTEM

(76) Inventor: Leonard M. Greene, 1010 Greacen Rd., Mamaroneck, NY (US) 10543

(*) Notice: Subject to any disclaimer, the term of this patent is extended or adjusted under 35 U.S.C. 154(b) by 463 days.

(21) Appl. No.: 11/111,919

(22) Filed: Apr. 22, 2005

(65) Prior Publication Data

US 2006/0241823 A1    Oct. 26, 2006

(51) Int. Cl.
*G05D 1/00* (2006.01)
(52) U.S. Cl. .............. 701/9; 701/6; 701/7; 701/14
(58) Field of Classification Search ............ 701/1, 701/6, 7, 8, 9, 13, 14, 15; 244/75.1, 177–182; 340/963–968
See application file for complete search history.

(56) References Cited

U.S. PATENT DOCUMENTS 6,188,330 B1 * 2/2001 Glover .................. 340/968
6,751,532 B2 * 6/2004 Inokuchi ................ 701/14

* cited by examiner

*Primary Examiner*—Richard M. Camby
(74) *Attorney, Agent, or Firm*—Lowe Hauptman Ham & Berner, LLP

(57) ABSTRACT

An airborne windshear detection and warning system includes a pitot tube for detecting the airspeed of an aircraft and an angle of attack vane for detecting an aircraft's angle of attack. Signals are generated and fed to a signal processor for determining a relationship between the airspeed and the aircraft's angle of attack. A signal indicative of the aircraft's normal relationship plus or minus a preselected value is also input into the signal processor. Then when the actual relationship exceeds the normal value plus or minus the preselected value for a preselected period of time, a signal is generated by the signal processor and is an indication of a hazardous windshear. A warning is then given to the pilot to take immediate corrective action.

6 Claims, 2 Drawing Sheets

AIRBORNE WINDSHEAR DETECTION AND WARNING SYSTEM

FIELD OF THE INVENTION

This invention relates to an airborne windshear detection and warning system and more particularly to an airborne system for detecting microbursts and warning a pilot of a dangerous condition.

BACKGROUND FOR THE INVENTION

Windshear may be defined as a condition that exists where the velocity and/or direction of the wind is significantly changing with relatively small changes in altitude. It also refers to serious microbursts, which are violent downburst of air which are particularly hazardous when an aircraft is descending through an air mass while making an approach to an airport.

The problems associated with microbursts which are referred to herein as serious windshear have been recognized since as early as 1977. Prior to that time microbursts were responsible for a number of accidents involving commercial airlines. Efforts were made to overcome the problem. However, the first successful approach to overcome such problems is disclosed in my U.S. Pat. No. 4,012,713 entitled, "System for Providing An Indication of Windshear." As described therein, a system for generating a windshear signal representing the windshear condition encountered by an aircraft includes means for generating a signal representing the rate of change of the instantaneous airspeed of the aircraft. The system also includes means for generating a signal representing the horizontal inertial acceleration of the aircraft and means for subtracting the horizontal inertial acceleration signal from the rate of change of instantaneous airspeed signal to provide a windshear or microbursts signal. In addition, the system may include means for processing the windshear signal to provide an indication representing the magnitude thereof. In a commercial embodiment of this invention, the system includes an audio warning to a pilot that the aircraft is approaching a dangerous windshear condition and that immediate corrective action should be taken.

There have been a number of other patents on windshear detection as for example, a U.S. patent of Glover, U.S. Pat. No. 6,188,330. As disclosed by Glover, a windshear detection system uses parameters provided by standard on-board air data management installed detection systems and in which no accelerometers are required. The system uses the following inputs; aircraft true airspeed, aircraft inertial ground speed, aircraft vertical speed, aircraft angle of attack, aircraft pitch angle and aircraft whole attitude ($\theta$) from a vertical gyro.

An additional U.S. patent of Lebrun, U.S. Pat. No. 4,281,383 discloses a system for detecting a wind radiant that utilizes the aerodynamic incline or flight path angle, the total flight path angle and the difference between the selected speed during the approach and the airspeed. The system also incorporates two accelerometers whose sensing axes are oriented parallel to the rolling axis and parallel to the pitch angle.

It is now believed that there will be a commercial market for a windshear detection and warning system in accordance with the present invention. It is believed that there will be a commercial market for such systems because they eliminate the need for determining inertial ground speed, aircraft vertical speed, aircraft pitch attitude and use of a vertical gyro and/or an inertial reference system.

Additionally, the windshear detection and warning system in accordance with the present invention are based solely on the relationship between changes in an aircraft's airspeed and its angle of attack. Such systems require only an angle of attack indicator, an airspeed indicator and a processor for comparing the relationship of the two values. It also requires an input of a threshold level to eliminate false warnings as well as a preselected time to eliminate a warning due to wind gusts. Accordingly, it is believed that the systems in accordance with the present invention are particularly suitable for general aviation and other aircraft that are not equipped with sophisticated aerodynamics. Further, such systems can be sold at a relatively low cost, facilitate installation and repair, are of relatively lightweight and durable. Therefore, such systems should appeal to the owners and operators of relatively small aircraft.

BRIEF SUMMARY OF THE INVENTION

In essence, the present invention contemplates an airborne windshear detection and warning system for general aviation and particularly for private aircraft which are not fully equipped with an array of sophisticated avionics. The system includes means for indicating the airspeed of an aircraft such as a conventional pitot tube and means for generating a first signal which is indicative of the aircraft's airspeed. The system also includes means for indicating the angle of attack of the aircraft as for example a conventional angle of attack vane and means for generating a signal indicative of the aircraft's angle of attack. Signal processing means such as a computer computes changes in the relationship between airspeed and angle of attack and for generating a signal indicative of a hazardous windshear when a change in the relationship between airspeed and angle of attack exceeds a preselected value for a preselected period of time as for example 1 to 1½ seconds. The time period is used to screen out false alarms due to wind gusts.

The invention also contemplates a method for detecting a hazardous windshear from an airborne aircraft and for warning a pilot of a need to take corrective action to avoid the hazard. The method includes the steps of detecting the airspeed of the aircraft and generating a first signal that is indicative of the airspeed of the aircraft. The method also includes the step of detecting an aircraft's angle of attack and generating a second signal indicative of the aircraft's angle of attack. The two signals are fed to a processor and compared to the normal relationship between the airspeed and the aircraft's angle of attack under normal conditions. A preselected value equal to acceptable excursions from the relationship between the airspeed and the angle of attack is also fed to the processor for indicating potential problems. A time delay signal of for example 1 to 1½ seconds is also fed into the processor. The processor then outputs a signal, which is in excess of the inputted value for a period in excess of the time delay and a windshear warning is given as for example, an audio visual or even tactile warning to warn a pilot of an imminent hazard.

The invention will now be described in connection with the accompanying figures.

DESCRIPTION OF THE PREFERRED EMBODIMENTS OF THE INVENTION

Figure 1:
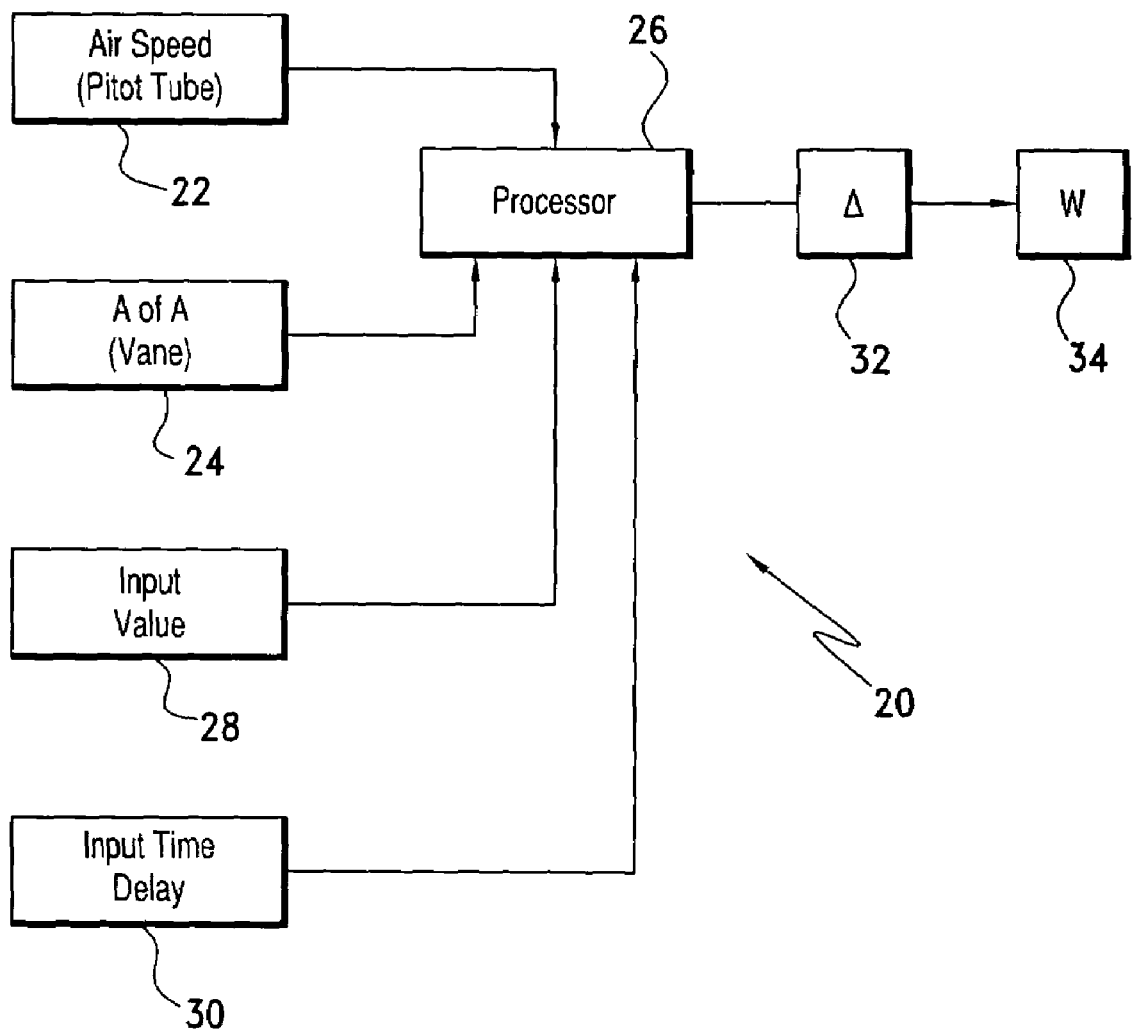
FIG. 1 is a schematic diagram of an airborne windshear detection and warning system in accordance with one embodiment of the invention.
Figure 2:
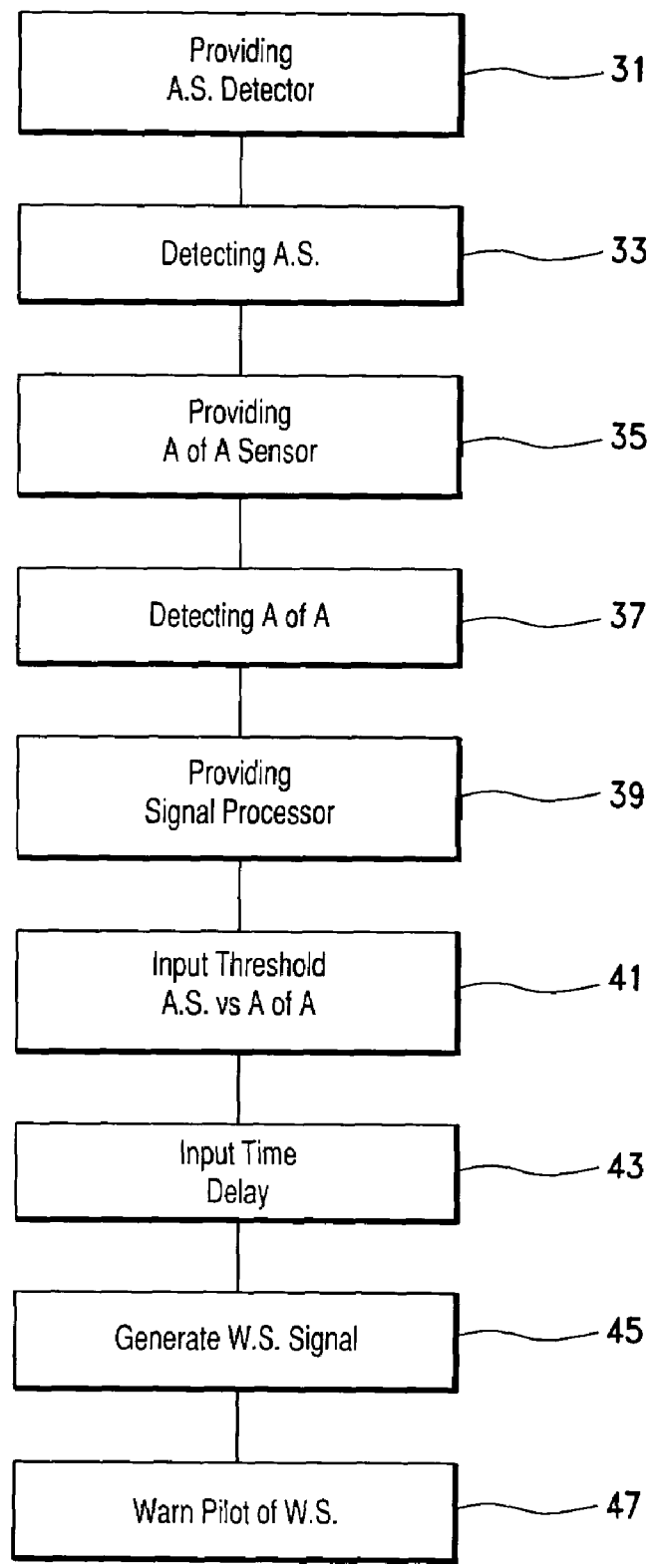
FIG. 2 is a flowchart that illustrates a method for detecting a hazardous windshear from an airborne aircraft in accordance with another embodiment of the invention.

An airborne windshear detection and warning system and method in accordance with the invention are illustrated in FIGS. 1 and 2. As used in this description, hazardous windshear defines a microburst that is a violent downburst of air that can drive a plane downwardly into the ground when encountered during an approach to a landing. However, the system and method according to the present invention provides an early warning and allows a pilot to take immediate corrective action to fly through the shear and to avoid a catastrophic result in much the same manner as a commercial pilot does upon receiving a windshear warning.

As shown in FIG. 1, an airborne windshear detection and warning system 20 is designed primarily for general aviation and more particularly for private aircraft which are not equipped with more sophisticated avionics such as accelerometers and the like.

The system 20 includes an airspeed indicator 22 such as a conventional pitot tube and means for generating a signal indicative of the aircraft's airspeed. The system 20 also includes an angle of attack indicator 24 such as an angle of attack vane and means for producing a signal indicative of an aircraft's angle of attack. The signals from the airspeed indicator 22 and angle of attack indicator 24 are each fed to a signal processor 26 such as a computer for comparing the relationship of changes in airspeed with respect to changes in the aircraft's angle of attack.

The signal processor 26 processes the signals from the airspeed indicator 22 and angle of attack indicator 24 to detect an increase in airspeed without a corresponding decrease in angle of attack or a decrease in airspeed without a corresponding increase in angle of attack.

A threshold level or value 28 is fed to the processor 26 and is indicative of a change in the relationship between the airspeed and the angle of attack that is attributed to a windshear condition. In other words, the threshold value is used to screen out normal fluctuations in the relationship between the aircraft's airspeed and angle of attack. Therefore, it is only changes in excess of the threshold value which are cause for concern.

A time delay signal 30 is also fed to the processor 26 to filter out or eliminate any changes in the relationship between the airspeed of the aircraft and its angle of attack that last for less than a preselected time period of perhaps 1 to 1½ seconds since such changes would be caused by wind gusts and generic windshear and are not particularly hazardous. Therefore, the output of the signal processor 26 is an indicator 32 of a highly hazardous windshear or microburst as caused by a significant change in the relationship between airspeed and angle of attack. Then when the indicator 32 which is a windshear signal i.e., in excess of the preselected value for a selected period of time, a windshear warning system 34 warns a pilot of imminent danger and to immediately take corrective action.

The details of a computer program or more detailed circuitry are well within the ability of a person of ordinary skill in the art. Accordingly, they have not been discussed in detail.

A second embodiment of the invention contemplates a method for the detection of a hazardous windshear or a microburst from an airborne aircraft. The method includes the steps of providing an airspeed indicator 31 such as a commercially available pitot tube and the step 33 of detecting the airspeed of the aircraft. The invention also includes the step 35 of providing an angle of attack sensor such as an angle of attack vane and a step 37 of detecting the aircraft's angle of attack. A key consideration in the present invention resides in the elimination of sophisticated avionics and providing a windshear detection and warning system solely from a comparison of the aircraft's airspeed and angle of attack and changes in that relationship. For this reason, the invention includes the step 39 of providing a signal processor such as an electrical circuit or computer which computes the relationship of the aircraft's airspeed and its angle of attack and changes therein in step 41.

Acceptable changes that is a threshold is inputted into the signal processor in step 41 to screen out minor changes and fluctuations in the relationship between the aircraft's airspeed and its angle of attack. Such changes are not indicative of a microburst. Along the same lines, a time period such as 1 or 1½ seconds is inputted into the signal processor in step 43 in order to screen out changes due to wind gusts.

In step 45 a hazardous windshear signal is generated and in step 47 a warning is given to the pilot by audio or visual means to take corrective action.

While the invention has been described in connection with its preferred embodiments, it should be recognized that changes and modifications may be made therein without departing from the scope of the appended claims.

What is claimed is:

1. An airborne windshear detection and warning system comprising:
    means indicative of the airspeed of an aircraft;
    means indicative of an aircraft's angle of attack;
    computer means for computing changes in the relationship between airspeed and angle of attack and for generating a signal indicative of a hazardous windshear when a change in the relationship between airspeed and angle of attack exceeds a preselected level for a preselected period of time.

2. An airborne windshear detection and warning system according to claim 1, which includes means for warning a pilot of a hazardous windshear.

3. An airborne windshear detection and warning system comprising:
    airspeed sensing means for generating a first signal indicative of an aircraft's airspeed;
    angle of attack sensing means for generating a second signal indicative of an aircraft's angle of attack;
    signal processing means for processing said first and said second signals to detect an increase in airspeed without a corresponding decrease in angle of attack or a decrease in airspeed without a corresponding increase in angle of attack and for generating a signal indicative of a change in the relationship between the airspeed and angle of attack of the aircraft; and
    means for generating a signal indicative of the proximity of a hazardous windshear when the signal indication of a change in the relationship between the airspeed and angle of attack exceeds a preselected level for a preselected period of time.

4. An airborne windshear detection and warning system according to claim 3, which includes means for warning a pilot of the proximity of a hazardous windshear.

5. An airborne windshear detection and warning system according to claim 4, in which said airspeed sensing means includes a pitot tube and said angle of attack sensing means includes an angle of attack vane.

6. A method for detecting a hazardous windshear from an airborne aircraft comprising the steps of:

detecting the airspeed of an aircraft and generating a first signal indicative of the aircraft's airspeed;

detecting an aircraft's angle of attack and generating a second signal indicative of the aircraft's angle of attack;

processing the first and second signals to establish a relationship between the aircraft's airspeed and the aircraft's angle of attack;

sensing changes in the relationship between the aircraft's airspeed and the aircraft's angle of attack; and warning a pilot of a hazardous windshear when the changes in the relationship between the aircraft's airspeed and the aircraft's angle of attack exceed a preselected amount for a preselected period of time.

* * * * *